T. Y. STEWART.
TIRE PROTECTOR.
APPLICATION FILED JULY 16, 1912.
1,066,861.
Patented July 8, 1913.
2 SHEETS—SHEET 2.
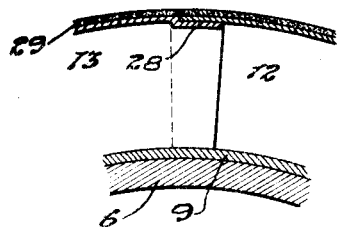
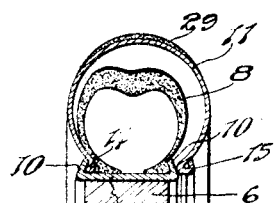
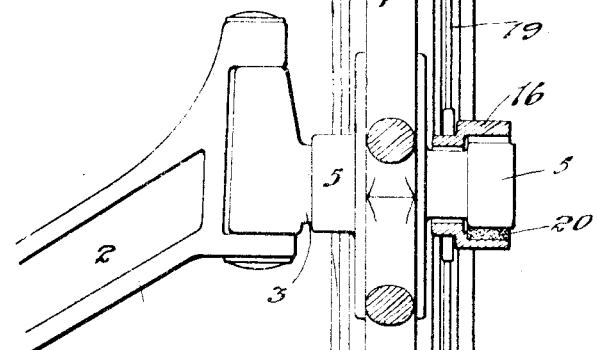
Fig. 4.
Fig. 3.
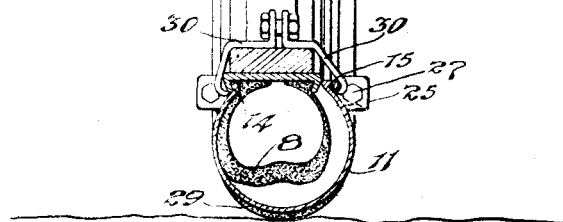
WITNESSES
INVENTOR
T. Y. Stewart

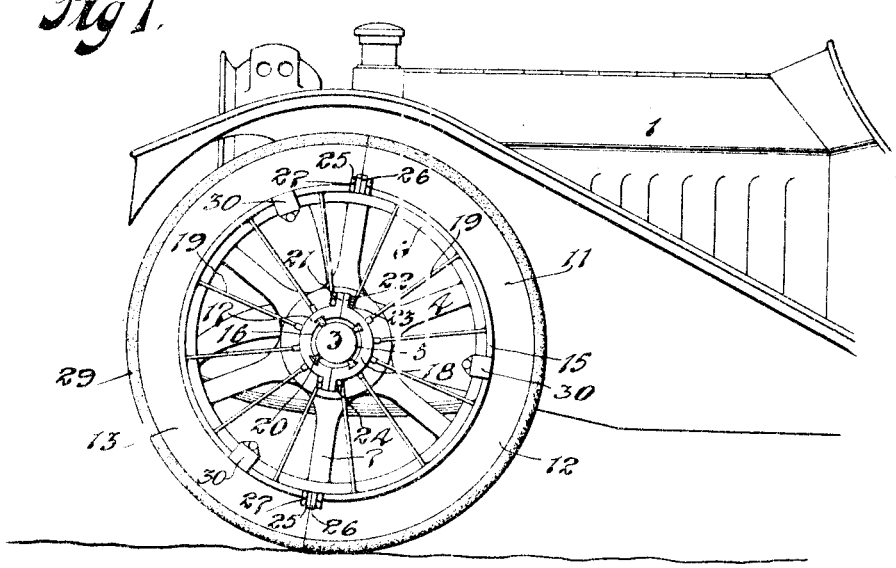

UNITED STATES PATENT OFFICE.

THOMAS YOUNG STEWART, OF WINNIPEG, MANITOBA, CANADA, ASSIGNOR OF ONE-HALF TO JAMES BIRREL, OF WINNIPEG, CANADA.

TIRE-PROTECTOR.

1,066,861.  Specification of Letters Patent.  Patented July 8, 1913.

Application filed July 16, 1912. Serial No. 709,630.

*To all whom it may concern:*

Be it known that I, THOMAS YOUNG STEWART, of the city of Winnipeg, in the Province of Manitoba, Canada, have invented certain new and useful Improvements in Tire-Protectors, of which the following is the specification.

The invention relates to a tire protector particularly designed for use in connection with an automobile and the object of the invention is to provide a sectional protector which can be quickly applied on an automobile wheel in event of the pneumatic tire of the wheel being rendered useless by puncture or otherwise.

A further object of the invention is to provide an inexpensive, non-puncturable device which can be applied without jacking up the automobile frame.

With the above objects in view the invention consists essentially of a sectional metallic rim or casing provided at one side with a sectional collar connected to the sections of the rim by spokes, and a cushioning means applied on the sections, the parts being arranged and constructed as hereinafter more particularly described.

Figure 1 represents a side view of a part of an automobile with my device applied. Fig. 2 represents a plan view of the same. Fig. 3 represents an enlarged detailed vertical sectional view through the wheel and applied protector, parts of the automobile being shown in front elevation. Fig. 4 represents an enlarged detailed vertical sectional view through a portion of the protector, the section being taken in the plane denoted by the line X—X' Fig. 2.

In the drawings like characters of reference indicate corresponding parts in each figure.

1 represents an automobile of which 2 is the cross axle, 3 a stub shaft pivotally secured to the axle in the usual way and 4 an automobile wheel comprising the hub 5, felly 6, spokes 7, pneumatic tire 8 and metallic rim 9.

The above parts are of ordinary construction and the details are not described with the exception of the rim 9 which it is to be noticed is supplied at the edges with upturned flanges 10.

11 represents my protector which is in reality a casing formed from two sections or halves 12 and 13 of sheet metal bent to present a more or less U-shaped cross section so as to receive and protect the pneumatic tire 8 when applied on the wheel. The edges 14 and 15 of the sections are spaced apart sufficiently to allow the protector to pass over and receive the deflated tire 8, the edge 14 resting in this position on the metallic rim 9 of the wheel on the inside while the edge 15 is clear of the said rim.

16 is a collar formed from two similar sections 17 and 18 arranged to span the hub of the wheel. Each collar section is connected to the protecting rim by spokes 19 the arrangement being such that each protector section carries a collar section when the protector is split apart. The collar sections are fitted with wedge shaped rubber or such like strips 20 which rest on the hub of the wheel. The collar sections are each fitted with lugs 21 and 22 arranged to be fastened together by bolts 23 and 24. The protector is also fitted with pairs of extending lugs 25 and 26 arranged to be secured together by bolts 27. The ends of one of the protector sections are slightly offset as indicated at 28 to pass within the ends of the other section.

29 represents a strip of rubber or other such like cushioning material applied on each of the protector sections. This is simply used to silence the protector as otherwise owing to its metallic construction it would make considerable noise of the roadway.

It is unnecessary for one to jack up his automobile to apply this protector. The half 13 of the protector would first be applied on the wheel in the position shown in Figs. 1 and 2 of the drawings. The automobile would then be advanced so that the wheel would ride in this section. The other section would then be applied from the top and bolted up to the first section.

In order to prevent the protector from slipping on the automobile wheel I have supplied clamps 30 which pass around the felly 6 of the wheel and hook into the edges of the sections. Any other suitable means can be employed for effecting this purpose.

What I claim as my invention is:—

1. A tire protector for a pneumatic wheel comprising a non-puncturable casing applied on the wheel and receiving the tire, said casing being formed from similar sections more or less U-shaped in cross section, the edges thereof being spaced apart to receive the tire of the wheel, one of said edges bearing on the rim of the wheel at the inside and the other of the edges being free of the outer edge of the rim of the wheel, a split collar receiving the hub of the wheel and spokes connecting the collar with the latter edge of the casing, as and for the purpose specified.

2. A tire protector for a pneumatic wheel comprising a non-puncturable casing applied on the wheel and receiving the tire, said casing being formed from similar sections more or less U-shaped in cross section, the edges thereof being spaced apart to receive the tire of the wheel, one of said edges bearing on the rim of the wheel at the inside and the other of the edges being free of the outer edge of the rim of the wheel, a collar formed from two sections adapted to receive the hub of the wheel, cushioning means carried by the collar sections, bolts connecting the collar sections, and spokes passing between the sections of the collar and the sections of the casing, as and for the purpose specified.

3. A tire protector for a pneumatic wheel comprising a non-puncturable sectional casing of substantially U-shape, the edges thereof being spaced apart to admit the tire wheel, applied on the wheel and receiving the tire, one of said edges resting on the rim of the wheel, and the other edge being free of the rim and means connecting said free edge to the hub of the wheel, as and for the purpose specified.

Signed at Winnipeg in the Province of Manitoba this 18th day of June 1912.

THOMAS YOUNG STEWART.

In the presence of—
G. S. ROXBURGH.
R. FOSTER.